Patented Sept. 18, 1934

1,973,914

UNITED STATES PATENT OFFICE 1,973,914

VULCANIZING RUBBER

George H. Stevens, Newark, N. J.

No Drawing. Application July 1, 1929, Serial No. 375,064

18 Claims. (Cl. 18—53)

This invention relates to improvements in the use of organic nitrogenous substances that assist in or accelerate the vulcanization of rubber and similar materials, and has for its object the utilization of new chemical reactions and new substances to this end.

This application is a continuation in part of: Serial Number 215,511 filed Aug. 25, 1927, now Patent 1,861,987, that relates to the use of the mono-substituted guanidine derivatives of mono-aryl substituted carbodiimide; Ser. No. 215,512 filed Aug. 25, 1927, that relates to the use of the tri- substituted guanidine derivatives of di- aryl substituted carbodiimide; and Ser. No. 258,148 filed Feb. 29, 1928, now Patent 1,925,707 that relates to the use of mono- and tri- tolyl substituted guanidines, or their higher homologues, in combination.

In Ser. No. 651,968 filed July 16, 1923, now Patent 1,921,375 I have claimed the use of a combination of carbomono— substituted imide and carbodi- substituted imide, with ammonia and a homologue of aniline as an accelerator. I have also broadly claimed therein the use of accelerators that comprise mono- and tri- substituted guanidines used in combination. The higher homologues of the former, in combination with the higher homologues of the latter, and solid solutions comprising any of these substances in such combination, form within certain limitations, the subject matter of the present invention.

Guanidine, the addition product of cyanamide and ammonia, is an accelerator, and even with a substitution of its hydrogen it retains the same structure, and is the same nucleus compound, so within the different primary and secondary amines, which themselves are also accelerators and from which the substituting groups are derived, rest the main differences in the numerous substituted guanidines that result, and which therefore must all be accelerators, but with physical and chemical properties that vary greatly.

Under a disassociation by heat, the disassociation products of these guanidine compounds then progressively polymerise into more or less quantity of melamines.

Mono- aryl substituted guanidines are addition products of mono- aryl substituted carbodiimides (mono- aryl substituted cyanamides), and ammonia.

Tri- aryl substituted guanidines of symmetrical form, are addition products of di- aryl substituted carbodiimides and primary amines of the benzene series, such as aniline, toluidine, xylidine, cumidine, duridine, or their methyl, ethyl, propyl, butyl, or higher homologous alkyl modifications, wherein the substituted carbodiimide and primary monamine possess any of these single mono- valent aromatic groups.

Tri- aryl substituted guanidines of unsymmetrical form, are addition products of di- aryl substituted cyanamide and the aforementioned primary aryl monamines, or are addition products of mono- aryl substituted carbodiimides and secondary monamines of the benzene series, such as di- phenylamine, di- tolylamine, di- xylilamine, di- cumylamine, di- durylamine, or their mixed bases, phenyl-tolylamine, phenyl-xylilamine, phenyl-cumylamine, phenyl-durylamine, tolyl-xylilamine, tolyl-cumylamine, tolyl-durylamine, xylil-cumylamine, xylil-durylamine, cumyl-durylamine, or the secondary phenyl-alkylamines, such as ethyl-aniline, methyl aniline, propyl aniline, and butyl aniline, or any other secondary amines that possess any of these double or bivalent aromatic or phenyl-alkyl, or alkyl-benzene substituting groups.

The tri- substituted guanidines contain then the substituting groups of both of their components.

Di- aryl substituted guanidines of symmetrical form, are addition products of di- aryl substituted carbodiimides and ammonia, or of mono- aryl substituted carbodiimides and the aforementioned primary amines.

Under disassociation by heat, which is not materially different in vulcanization than outside of it, these substituted guanidines break up or disassociate into the same components again, the reactions being usually reversible.

Under such disassociation, the mono- substituted guanidines split off ammonia, but the symmetrical and unsymmetrical tri- substituted guanidines split off an aryl amine instead.

The symmetrical and unsymmetrical di- substituted guanidines under disassociation however, split off both ammonia and an aryl amine.

In addition then to the above amines split off by heat, the principal disassociation product of mono- substituted guanidine is mono- substituted carbodiimide, while that of symmetrical tri- substituted guanidine is di- substituted carbodiimide.

Symmetrical di- substituted guanidine however, disassociates into both mono- and di- substituted carbodiimide, and unsymmetrical tri- substituted guanidines disassociate into both mono- and di- substituted cyanamide.

Only symmetrical di- substituted and unsymmetrical tri- substituted guanidines then disassociate into both mono- and di- substituted carbodiimides or cyanamides respectively.

The foregoing mono-, di-, and tri-, substituted guanidines under disassociation by heat, then gradually and progressively form aryl substituted melamines, which are the tri- molecular polymerization products that result upon combining three molecules of any of the aforementioned aryl substituted carbodiimide-, or aryl substituted cyanamide- disassociation products of these substituted guanidines, and these melamines are all useful in vulcanization.

The main disassociation product of mono- substituted guanidine is mono- substituted carbodiimide which polymerises to tri- substituted iso- melamine, while that of symmetrical tri- substituted guanidine is di- substituted carbodiimide which polymerises to hexa- substituted iso- melamine, and that of unsymmetrical di- substituted guanidine and symmetrical tetra- substituted guanidine is a di- substituted cyanamide that polymerises to "per"- substituted, or hexa- substituted normal melamine. These substituted melamines in each case indicating that but one form of substituted carbodiimide, or substituted cyanamide, was present in the disassociation.

The disassociation products of symmetrical di- substituted guanidine comprising both mono- and di- substituted carbodiimide, can polymerise to tetra- substituted iso- melamine, and those of unsymmetrical tri- substituted guanidine comprising both mono- and di- substituted cyanamide, can polymerise to tetra- substituted normal melamine.

Only symmetrical di- substituted, and unsymmetrical tri- substituted guanidines then under disassociation, result in both mono- and di- substituted carbodiimides, or cyanamides, respectively, that can polymerise to tetra- substituted melamines, and the former symmetrical di- substituted guanidine is the only one of these that also has ammonia present in its disassociation.

Under the heat of vulcanization, substituted guanidine accelerators disassociate, and simultaneously the catalytic function of accelerating vulcanization is then carried out, through some cycle reaction that involves these several disassociation components, because molecular relations between 100 parts of rubber and .05 part of accelerator would be out of the question (Ostromislensky, "The Action of the Amines and Metallic Oxides on Vulcanization", Jour. Russ. Phys. Chem. Soc. 47, 1915, 1892–1898).

So long as ammonia is present in the disassociation, under the action of heat it will activate any of these imide or cyanamide bodies, or even their melamines, thereby causing them to continue to function as accelerators, and so long as primary or secondary monamines are present in the disassociation, under the action of heat they will activate any of the mono- molecular forms of the substituted carbodiimides, though in a lesser manner, but as the carbodiimide or cyanamide bodies progressively polymerise to di- and tri- molecular forms, such activation by the monamines becomes lessened, until with the melamine it is at its minimum, and when both the ammonia and monamine have become dissipated through the heat of vulcanization, such conversion to substituted melamine inhibits accordingly any further interreaction, or acceleration, as the melamines cannot easily supply ammonia or aryl amines for further cycle reactions.

In using di- substituted guanidine accelerators then, the diversity of their disassociation products is of significance, the presence of ammonia in their disassociation proves necessary, and the quantity of ammonia thus present is of importance for a proper and active acceleration, then the ultimate presence of substituted melamine also appears necessary, and its quantity is of equal importance for terminating such interreactions when vulcanization is completed, and because they possess these requisite characteristics the symmetrical di- substituted guanidines are valuable accelerators.

In using aryl substituted guanidines as accelerators, the presence then of any tetra- substituted melamine in the resultant vulcanized compound, indicates that both a mono- and a di- substituted carbodiimide or cyanamide were present in the vulcanization, and if the melamine is of the iso- form, that is a tetra- substituted tricarbodiimide, that both ammonia and an aryl amine had also been present in the vulcanization, and therefore a suitable diversity of disassociation components had been present for the requisite interreactions, or cycle reactions, whereas if the melamine is of the normal form, that an aryl amine was the only amine that was present in the vulcanization.

It is apparent therefore, that between different substituted guanidine accelerators having similar substituting aromatic groups, that the one that splits off the most ammonia, and that ultimately can form the most tetra- substituted melamine, will be the most practical accelerator.

After an accelerated vulcanization is completed, it is obvious that the accelerator then should become as inert as possible.

To inhibit such further vulcanizing activity, where the accelerator still retains some of its original characteristics, or where its components are of low melting point, is usually difficult, but if the accelerator be so structurally constituted as to permit of a slow change during vulcanization, to a different, high melting, lesser active compound, then its catalytic function in such new form becomes restricted, and just such a transformation is found to take place in the gradual formation of these high melting aryl substituted melamines, that result from the disassociation products of the several aryl substituted guanidines described.

Where the nucleus of each carbodiimide molecule is of symmetrical form, the resultant melamine is an aryl substituted iso- melamine, or aryl substituted tri- carbodiimide, but where the nucleus of each component molecule is of unsymmetrical form as in cyanamide, the resultant melamine is an aryl substituted normal melamine.

Both symmetrical and unsymmetrical forms of the mono- molecular components may be present in the same molecule of substituted melamine, or the melamine may even contain molecules of cyanamide.

The higher molecular weight aryl substituted melamines usually have quite high melting points, which thereby materially aids their withdrawal from acceleration after their complementary amines are dissipated.

It is apparent then, that where either a symmetrical mono- or symmetrical tri- substituted guanidine is used alone, no formation either of the normal or of the iso- forms of a tetra- substituted melamine could be possible from these components, respectively.

While it is possible however, for an unsymmetrical tri- substituted guanidine to disassociate into four components that may be capable of forming tetra- substituted melamines, no ammonia however will be found present in such disassociation, and the melamine will not be of the iso- form.

But where either symmetrical or unsymmetrical di- aryl substituted guanidine is used, should any interreaction or cycle reaction take place, there will be four disassociation components present including ammonia, that are capable of interreactions to mono- and tri- substituted guanidines, as well as to the original symmetrical di- substituted guanidine started with, or to guanidine and tetra- substituted guanidines, as well as to the original unsymmetrical di- substituted guanidine started with, though the disassociation components of the symmetrical body only, are capable of forming a tetra- substituted melamine.

That is, any guanidine accelerator, that under heat will break up into four disassociation components that include ammonia, and the components suitably diversified so that a tetra- substituted iso- melamine can form therefrom, offers a greater opportunity for such interreactions or cycle reactions taking place, than is offered by a guanidine accelerator that has no ammonia present in its disassociation, or where its disassociation components are limited to only reverse reactions, or are not sufficiently diversified to permit of a tetra- substituted iso- melamine being formed therefrom.

The chemistry of the foregoing guanidine substances being well established, it is plainly evident then that a like diversity of disassociation components, and the same resultant tetra-substituted iso- melamine, but in a greater amount of each, will be found through a use of mono- and tri- substituted guanidines in conjunction with each other, for in such cases both ammonia and an aryl amine, and both a mono- and a di- substituted carbodiimide or di- substituted cyanamide will also be present in the acceleration, and a tetra- substituted melamine can also result therefrom, in just the same manner as occurs in using symmetrical di- aryl substituted guanidines.

Under their disassociation by heat, molecular proportions of mono- and tri- aryl substituted guanidines will release a much larger percent of ammonia, while from two molecular proportions of the former and one of the latter the accompanying disassociation products are capable of forming a substantially larger percent of tetra-substituted iso- melamine, than can result from using an equal amount of any symmetrical di- substituted guanidine that may have similar aryl substitutions.

Mono- aryl substituted guanidines can therefore be advantageously combined with tri- aryl substituted guanidines as accelerators, whether the separate guanidines be of symmetrical or unsymmetrical form, whether the substituting groups be alike or isomerically different in the same guanidine, or whether the substituting aromatic groups be the same, or are different in constitution in the two guanidines, and any such combinations of mono- and tri-substituted guanidine will prove of superior value as accelerators in those cases where ammonia is possible of being split off in the disassociation, and the disassociation products are capable of forming tetra- aryl substituted melamines, whether the substituting groups in the melamine be alike, or are isomerically different, or are different in composition.

That is, a greater and more prolonged interreaction activity is possible, through the use of mono- and tri-aryl substituted guanidines in combination, than is possible where the mono-, di-, or tri- similarly substituted guanidines respectively are used alone.

Ammonia is a strong base, but its basic character is diminished or partially neutralized however, when a phenyl radical substitutes one of the hydrogens in ammonia, as in primary phenyl amine, whereas the substitution of an alkyl group instead has the opposite effect, as in the alkylamines which are even stronger bases than ammonia, and their basicity is duly increased as the number of alkyl substitutions therein is increased.

The phenyl radical then is of a somewhat negative character, but as it becomes modified by methyl substitutions this negative character changes, the same as with the alkylamines, and its basicity thereby increases, and this change becomes especially noticeable when two or more such methyl or alkyl substituting groups have been introduced into the phenyl radical of an aryl amine.

Purely secondary aryl amines of the type of diphenyl amine are even feebler bases than the corresponding primary aryl amines, but where such secondary aryl amines are mixed bases, of the type of phenyl-tolyl amine, or of the phenyl-alkylamines mentioned, then they have markedly basis properties.

As these primary and secondary aryl amines may be considered as mono- aryl, or di- aryl substituted ammonia, the difference in the basicity of the aryl amine rests then, mainly in the differences in their substituting groups.

This phenomenon of increased basicity, due both to mixed groups, and to poly- methyl substitutions in the aromatic groups, continues in the aryl substituted guanidines having substituting radicals derived from these aryl amines, not only where these mixed di- valent groups take the place of two amino hydrogens in guanidine, or where poly- methyl groups take the place of hydrogen in substituting aromatic groups, but also where any use of mixed aryl substituted guanidine compounds involves two or more aromatic groups that are different in composition, and particularly where aromatic groups are involved that contain a plurality of alkyl substitutions.

The basicity of such guanidine compounds increases therefore, not only from a mixing of the substituting aromatic groups, but increases mainly according to the degree of modification of the phenyl radical by methyl or alkyl substitutions, and such increased basic character in a guanidine compound is indicative of increased accelerating properties.

The accelerating substances particularly comprised by this application are then, those mono- and tri- substituted guanidines used in combination, that are characterized by having substituting aromatic groups that have been derived from either primary or secondary amines of the benzene series, wherein an aromatic group in at least one of the substituted guanidines contains a plurality of methyl ($CH_3$), substitutions. Such methyl groups may replace hydrogen in the benzene ring, or replace hydrogen in other methyl groups that are either in the benzene ring, or are in the side chain of the aromatic group that substitutes the hydrogen in guanidine. Such aromatic groups then will contain more than 7 carbon atoms.

Suitable mono- substituted guanidines that may be used according to my invention, are the numerous amido- poly- methyl benzene substituted guanidines such as:

Amido- di- methyl benzene substituted guanidines having a single substituting aromatic group, and of which the following are examples:

Mono- ortho-xylil guanidine (1:2:6). Mono- ortho-xylil guanidine (1:2:4). Mono- meta-xylil guanidine (1:3:5). Mono- meta-xylil guanidine (1:3:6). Mono- meta-xylil guanidine (1:3:2). Mono- para-xylil guanidine (1:4:5).

Amido- tri- methyl benzene substituted guanidines having a single substituting aromatic group, and of which the following are examples:

Mono- cumyl guanidine (1:2:3:4). Mono- cumyl guanidine (1:3:4:2). Mono- cumyl guanidine (1:3:5:6). Mono- cumyl guanidine (1:2:3:5). Mono- cumyl guanidine (1:3:4:5). Mono- cumyl guanidine (1:2:4:5). Including the groups from mesitylene, hemimellithene, and the pseudo- cumidines.

Amido- tetra- methyl benzene substituted guanidines having a single substituting group and of which the following are examples:

Mono- duryl guanidine (1:2:3:4:6). Mono- duryl guanidine (1:3:4:5:6). Mono- duryl guanidine (1:2:4:5:6). Including the groups from prehnitene and iso- durene.

The amido- penta- methyl benzene mono- substituted guanidine (1:2:3:4:5:6), is also an example.

Or any mono- substituted guanidine having a benzene ring substitution, with the benzene ring having either poly- methyl substitutions, or having methyl and other alkyl substitutions, or having alkyl substitutions for hydrogen of the methyl substitutions, and further examples of which will be found in the:

Mono- substituted guanidines with propyl or iso- propyl-benzene substitutions, or with methyl-propyl or methyl- iso- propyl-benzene substitutions, or with poly- methyl- propyl or poly-methyl- iso- propyl benzene substitutions, or any similar mono- aryl substituted guanidines that contain ethyl, butyl, or homologous groups in either the normal or iso- forms of the alkyl-benzene homologues, all of which are to be considered as mono- substituted guanidines, the substituting groups of which contain a plurality of methyl substitutions.

Suitable tri- substituted guanidines that may be used according to my invention, are those having substituting groups similar to any of those in the ortho-, para-, meta-, or other aforementioned isomeric forms of xylil, cumyl, duryl, or homologous poly-methyl benzene mono- substituted guanidines that are mentioned; and wherein the three substituting groups may be alike, or isomerically different, or different in composition, in the same tri- substituted guanidine molecule, but having at least one substituting aromatic group that contains a plurality of methyl substitutions.

The disassociation products of these mono- and tri- substituted guanidines that are utilized in the aforementioned combinations, are those mono- and di- substituted carbodiimides and di- substituted cyanamides, having substituting groups similar to any of those in the ortho-, para-, meta-, or other aforementioned isomeric forms of xylil, cumyl, duryl, or homologous poly- methyl benzene mono- substituted guanidines mentioned, together with primary or secondary amines of the benzene series having a similar group, or groups homologous thereto, and ammonia.

The tetra- substituted melamines, or tri- molecular polymerization products that may form from using mono- and tri- substituted guanidines in the aforementioned combinations, are those having four substituting groups similar to any of those in the ortho-, para-, meta-, or other aforementioned isomeric forms of xylil, cumyl, duryl, or homologous poly- methyl benzene mono- substituted guanidines mentioned, or similar to those in their substituted carbodiimides, or substituted cyanamides, whether the substituting groups are alike, or isomerically different, or different in composition in the same substituted melamine molecule, or whether the resultant tetra- substituted melamine forms as a mixture of differently substituted melamine molecules.

Examples showing the use of my invention are given in the following vulcanizable compounds:

82 lbs. smoked sheets, 5 lbs. zinc oxide, 7 lbs. barytes, and 5½ lbs. sulphur, may constitute the compounded rubber; to which add 2½ ozs. mono-xylil substituted guanidine, and 5½ ozs. tri- xylil substituted guanidine. Heat the vulcanizable compound at 40 lbs. steam pressure for 25 to 35 minutes to vulcanize.

Or instead, 2½ ozs. mono- phenyl substituted guanidine and 5½ ozs. tri- xylil substituted guanidine; or 2½ ozs. mono- tolyl substituted guanidine and 5½ ozs. tri- cumyl substituted guanidine; or 2½ ozs. mono- duryl substituted guanidine and 5½ ozs. tri- duryl substituted guanidine; or 2½ ozs. mono- meta- xylil guanidine and 5½ ozs. of tri- substituted guanidine having phenyl and para- tolyl substituting groups; or 2½ ozs. mono- cumyl substituted guanidine and 5½ ozs. tri- substituted guanidine having tolyl and xylil substituting groups; may be added separately, as a mixture, or as a solid solution, to the above quantity of compounded rubber, and then vulcanize.

As the substituted guanidines that are particularly comprised by my invention possess aromatic groups that contain a plurality of methyl or alkyl substitutions, they are then the higher homologues or higher molecular weight bodies of the series, frequently with high melting points, and so they usually exist in numerous isomeric forms, and because these several isomers are difficult to separate from each other, two or more such substituted guanidine isomerides may be used together, and preferably in the form of a solid solution, that is, in just the mixed form that the combined or mixed substituted guanidine base may be precipitated from its neutralized acid salt solution in manufacturing, and in consequence have a lowered or modified melting point.

Material advantages are also frequently gained by using differently substituted guanidines in combination, as for example where the substituting groups of the two guanidines are different in composition, and particularly where one of the substituted guanidines has a melting point materially higher than the temperature of vulcanization, and alone may be deficient in activity as an accelerator. In such case a solid solution comprising both guanidines can be made, whereby the higher melting point is lowered, and a single or common melting point for both guanidines results, and the solid solution accelerator becomes thereby more effective for vulcanization purposes.

Such a solid solution of mono- and tri- substituted guanidines can be made by adding the acid salt solution of one guanidine to the acid salt solution of the other guanidine and then neutralizing and precipitating together as a solid solution of both substituted guanidines, which solid solution will be a substance that will have a single or common melting point of all the constituent substituted guanidines.

The interreactions that are shown as possible between the disassociation products of the various substituted guanidines mentioned, therefore furnish adequate reasons for using, and my experiments confirm the advantages to be gained, in the combined use of these mono- and tri- substituted guanidines as accelerators.

The incorporation into rubber then of a combination of mono- substituted guanidine and tri- substituted guanidine, with at least one of the guanidines having substituting aromatic groups that contain a plurality of methyl substitutions, and the disassociation products of which will comprise carbomono- substituted imide (mono- substituted cyanamide), carbodi- substituted imide (or di- substituted cyanamide), ammonia, and aniline or homologue thereof, or a combination of any equivalent of these same substances as an accelerator, broadly constitutes the present invention, or: any acceleration of vulcanization that results from heating rubber with an equivalent combination of, desulphurised mono- aryl substituted thiourea, and desulphurised di- aryl substituted thiourea, in the presence of ammonia, and aniline or homologue thereof, is to be considered as comprised by this invention, and such broad invention was set forth in the original specification and claims of Ser. No. 651,968 but in the present application has been limited to requiring that at least one of the substituting aromatic groups, in any such combination of mono- and tri- substituted guanidines, or in any such combination of their equivalent components, must have a plurality of methyl substitutions.

Having now described my invention, and having shown the manner in which the products mentioned may be prepared and utilized, what I claim as new, and desire to secure by Letters Patent is:

1. A process of vulcanizing rubber which consists in, incorporating into rubber an accelerator comprising the combination of a mono- xylil guanidine and a tri- xylil guanidine, then heating the resultant rubber mixture with a vulcanizing agent to effect vulcanization.

2. A process of vulcanizing rubber which consists in, combining with compounded rubber or similar material an accelerator that comprises the combination of a mono- xylil substituted guanidine and a mixture of tri- xylil substituted guanidines, then heating the resultant rubber mixture with a vulcanizing agent to effect vulcanization.

3. A process of vulcanizing rubber which consists in, combining with compounded rubber or similar material an accelerator that comprises the combination of a mixture of mono- xylil substituted guanidines and a tri- xylil substituted guanidine, then heating the resultant rubber mixture with a vulcanizing agent to effect vulcanization.

4. A process of vulcanizing rubber which consists in, combining with compounded rubber or similar material an accelerator that comprises the combination of a mixture of mono- xylil substituted guanidines and a mixture of tri- xylil substituted guanidines, then heating the resultant rubber mixture with a vulcanizing agent to effect vulcanization.

5. A process of vulcanizing rubber which consists in, combining with compounded rubber or similar material an accelerator that comprises the combination of a mixture of mono- xylil substituted guanidines including mono- meta-xylil guanidine, and a mixture of tri- xylil substituted guanidines including tri- meta-xylil guanidine, then heating the resultant rubber mixture with a vulcanizing agent to effect vulcanization.

6. A process of vulcanizing rubber which consists in, combining with compounded rubber or similar material an accelerator that comprises the combination of a mono- xylil substituted guanidine, and a tri- substituted guanidine having substituting aromatic groups, wherein at least one of the aromatic groups of the combination contains a plurality of methyl substitutions, then heating the resultant rubber mixture with a vulcanizing agent to effect vulcanization.

7. A process of vulcanizing rubber which consists in, combining with compounded rubber or similar material an accelerator that comprises the combination of a mono- substituted guanidine having a substituting aromatic group that contains a plurality of methyl substitutions, and a tri- xylil substituted guanidine, then heating the resultant rubber mixture with a vulcanizing agent to effect vulcanization.

8. A process of vulcanizing rubber which consists in, combining with compounded rubber or similar material an accelerator that comprises the combination of a mono- substituted guanidine and a tri- substituted guanidine, each of the guanidines having substituting aromatic groups, and at least one of the aromatic groups of the combination containing a plurality of methyl substitutions, then heating the resultant rubber mixture with a vulcanizing agent to effect vulcanization.

9. A process of vulcanizing rubber which consists in, combining with compounded rubber or similar material an accelerator that comprises the combination of a mixture of mono- substituted guanidines and a mixture of tri- substituted guanidines, each of the guanidines having substituting aromatic groups, and at least one of the aromatic groups of the combination containing a plurality of methyl substitutions, then heating the resultant rubber mixture with a vulcanizing agent to effect vulcanization.

10. A process of vulcanizing rubber which consists in, combining with compounded rubber or similar material an accelerator that comprises the combination of a mono- substituted guanidine, having an aromatic group of more than 7 carbon atoms substituted on the alpha- nitrogen atom with hydrogen atoms on the gamma- nitrogen atom, and a tri- substituted guanidine, having an aromatic group of more than 7 carbon atoms substituted on both the alpha- and gamma- nitrogen atoms, and each of the aromatic groups containing a plurality of alkyl substitutions, then heating the resultant rubber mixture with a vulcanizing agent to effect vulcanization.

11. A process of vulcanizing rubber which consists in, combining with compounded rubber or similar material an accelerator that comprises the combination of a mono- substituted guanidine, and a tri- substituted guanidine having substituting aromatic groups, and wherein at least one of the aromatic groups of the combination contains a plurality of methyl substitutions, then heating the resultant rubber mixture with a vulcanizing agent to effect vulcanization.

12. A process of vulcanizing rubber which consists in, combining with compounded rubber or similar material an accelerator that comprises the combination of a mono- substituted guanidine having a substituting aromatic group that contains a plurality of methyl substitutions, and a tri- substituted guanidine, then heating the resultant rubber mixture with a vulcanizing agent to effect vulcanization.

13. A process of vulcanizing rubber which consists in, combining with compounded rubber or similar material on accelerator that comprises the combination of a solid solution of mono- substituted guanidine and a solid solution of tri- substituted guanidine, each of the guanidines having substituting aromatic groups, and with at least one of the aromatic groups of the combination containing a plurality of methyl substitutions, then heating the resultant rubber mixture with a vulcanizing agent to effect vulcanization.

14. That process of vulcanizing rubber characterized by heating compounded rubber or similar material with a vulcanizing agent together with a solid solution of mono- and tri- substituted guanidines, each of the guanidines having substituting aromatic groups, and with at least one of the aromatic groups of the combination containing a plurality of methyl substitutions.

15. A vulcanizable composition comprising rubber, a vulcanizing agent, mono- xylil substituted guanidine, and tri- xylil substituted guanidine.

16. A vulcanized rubber obtained by inducing a reaction between rubber, a vulcanizing agent, a mono- xylil substituted guanidine, and a tri- xylil substituted guanidine.

17. Vulcanized rubber products vulcanized with the addition of a small amount of a mixture of mono- xylil substituted guanidine and tri- xylil substituted guanidine.

18. A vulcanized compound derived from compounded rubber or similar material, combined with a vulcanizing agent and an accelerator comprising a mono- substituted guanidine and a tri- substituted guanidine, with at least one of the guanidines having substituting aromatic groups, and with at least one of the aromatic groups of the combination containing a plurality of methyl substitutions.

GEORGE H. STEVENS.